US008899350B2

(12) United States Patent
 Nadeau (10) Patent No.: US 8,899,350 B2
(45) Date of Patent: Dec. 2, 2014

(54) METHOD AND APPARATUS FOR DETECTION OF DRILL BIT WEAR

(75) Inventor: Frederic Nadeau, Laval (CA)

(73) Assignee: Caterpillar Inc., Peoria, IL (US)

(*) Notice: Subject to any disclaimer, the term of this patent is extended or adjusted under 35 U.S.C. 154(b) by 558 days.

(21) Appl. No.: 13/278,521

(22) Filed: Oct. 21, 2011

(65) Prior Publication Data

US 2012/0152618 A1    Jun. 21, 2012

Related U.S. Application Data

(60) Provisional application No. 61/423,730, filed on Dec. 16, 2010.

(51) Int. Cl.
 *E21B 7/00* (2006.01)
 *E21B 12/02* (2006.01)
 *G05B 19/042* (2006.01)

(52) U.S. Cl.
 CPC ....... *E21B 12/02* (2013.01); *G05B 2219/24077* (2013.01); *G05B 19/0428* (2013.01); *G05B 2219/2616* (2013.01)
 USPC .............. 175/57; 175/39; 175/40; 175/24

(58) Field of Classification Search
 USPC .......................................... 175/39, 40, 24, 57
 See application file for complete search history.

(56) References Cited

U.S. PATENT DOCUMENTS

| | | | |
|---|---|---|---|
| 4,228,514 A | 10/1980 | Weiss | |
| 4,794,535 A | 12/1988 | Gray et al. | |
| 4,914,591 A | 4/1990 | Warren et al. | |
| 5,216,917 A * | 6/1993 | Detournay | 73/152.59 |
| 5,305,836 A | 4/1994 | Holbrook et al. | |
| 5,415,030 A | 5/1995 | Jogi et al. | |
| 5,857,166 A * | 1/1999 | Kim | 702/179 |
| 6,817,425 B2 | 11/2004 | Schultz et al. | |
| 7,243,735 B2 | 7/2007 | Koederitz et al. | |
| 7,333,922 B2 | 2/2008 | Cannon | |
| 7,484,571 B2 | 2/2009 | Gaudette et al. | |
| 7,604,072 B2 | 10/2009 | Pastusek et al. | |
| 7,707,009 B2 | 4/2010 | Steinke | |
| 2004/0059554 A1* | 3/2004 | Goldman et al. | 703/7 |
| 2010/0122848 A1 | 5/2010 | McClain | |

OTHER PUBLICATIONS

CAT, Aquila™ Drill System, AEHQ5828, Dec. 2007, (12 pages).
CAT® Terrain for Drilling, AEHQ6176, Jan. 2011, (12 pages).

* cited by examiner

*Primary Examiner* — Giovanna Wright
*Assistant Examiner* — Richard Alker
(74) *Attorney, Agent, or Firm* — Finnegan, Henderson, Farabow, Garrett & Dunner LLP (57) ABSTRACT

A method for determining wear of a drill bit is disclosed. The method includes drilling a first hole in a worksite based on a hole pattern having a plurality of planned holes and determining an energy required to drill the first hole. The method also includes drilling a second hole in the worksite and determining an energy required to drill the second hole. The method further includes determining a wear of the drill bit using the determined energy required to drill the first hole and the determined energy required to drill the second hole.

20 Claims, 5 Drawing Sheets

METHOD AND APPARATUS FOR DETECTION OF DRILL BIT WEAR

RELATED APPLICATION

This application is based upon and claims the benefit of priority from U.S. Provisional Application No. 61/423,730 filed on Dec. 16, 2010, the entire contents of which are incorporated herein by reference.

TECHNICAL FIELD

The present disclosure relates generally to a method and apparatus for detection of drill bit wear, and, more particularly, to a method and apparatus for detection of wear of a drill bit configured to penetrate a worksite surface.

BACKGROUND

Blast hole drilling operations often use mobile machines to drill multiple blast holes in a worksite. During the drilling operation, a drill bit on the end of the drill may become worn and require replacement. The bit may also experience a catastrophic failure, leading to partial or complete inoperability of the bit. If the operator is unaware of the state of the drill bit, the operator may continue using the bit for current or future drill holes, thus resulting in suboptimal performance for the drilling operation. Additionally, if the operator is unable to plan for a needed bit change, the operator may be required to remove the drill string from the hole in the middle of a drilling process, which may be costly and inefficient.

This disclosure is directed at overcoming one or more of the problems described above.

SUMMARY

In one aspect, the present disclosure is directed to a method for determining wear of a drill bit. The method includes drilling a first hole in a worksite based on a hole pattern having a plurality of planned holes and determining an energy required to drill the first hole. The method also includes drilling a second hole in the worksite and determining an energy required to drill the second hole. The method further includes determining a wear of the drill bit using the determined energy required to drill the first hole and the determined energy required to drill the second hole.

In another aspect, the present disclosure is directed to a control system for a mobile drill rig. The drill rig includes a drill and a controller. The controller is configured to drill a first hole in the worksite with the drill based on a hole pattern having a plurality of planned holes and determine an energy required to drill the first hole. The determined energy required to drill the first hole is used by the controller to identify strata through which the first hole passes. The controller is also configured to drill a second hole in the worksite with the drill adjacent the first hole and determine an energy required to drill the second hole. The determined energy required to drill the second hole is used by the controller to identify strata through which the second hole passes. The controller is further configured to determine a wear of the drill bit using the determined energy required to drill the first hole and the determined energy required to drill the second hole and communicate the strata information and wear information to an operator of the drill rig.

DETAILED DESCRIPTION

Figure 1:
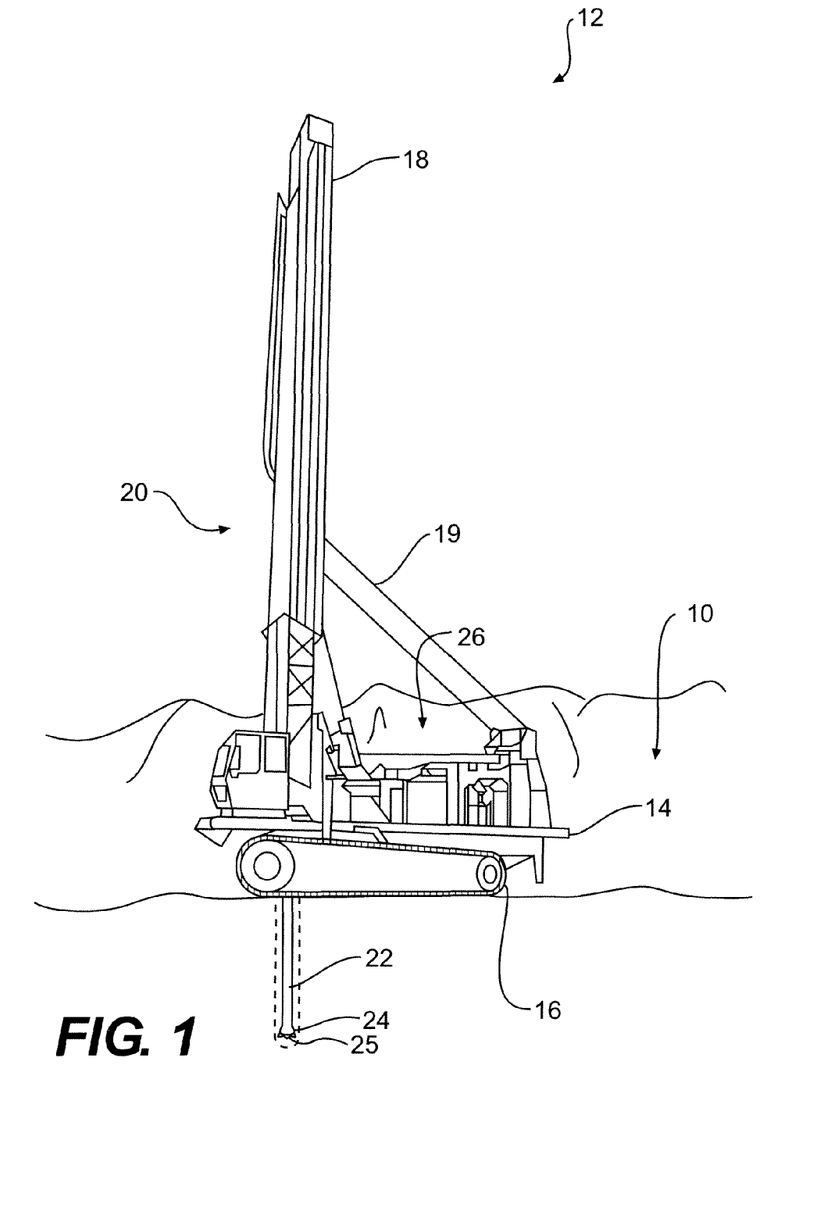
FIG. 1 is a diagrammatic illustration of an exemplary disclosed drill rig.

FIG. 1 illustrates an exemplary worksite 10. Worksite 10 may support a number of operations, including, for example, a mining operation. The mining operation may include sub-operations for removing and processing material, such as drilling, blasting, and hauling. The drilling sub-operation is performed by a machine 12, and may be directed to drilling holes in a surface of worksite 10. Explosives may subsequently be placed in the drilled holes for blasting. After detonating the explosives, loose material remaining in the location of the blasting may be hauled away for removal purposes and/or processing.

Machine 12 is a mobile machine configured to drill holes (e.g., a drill rig). Machine 12 includes a mobile platform 14 configured to move machine 12 about worksite 10. Mobile platform 14 may be coupled to a power source (not shown), such as a diesel or gas powered engine. It is also contemplated that the power source may be located remotely from machine 12. Specifically, the power source may embody a generator which is coupled to machine 12 by a length of power cable.

Machine 12 may also include a plurality of ground engaging devices 16. Ground engaging devices 16 are configured to engage the worksite surface and propel mobile platform 14. Ground engaging devices 16 may include tracks, wheels, or any other ground engaging device known in the art. In the embodiment of FIG. 1, machine 12 includes two ground engaging devices 16, one located on either side of machine 12. It is contemplated, however, that machine 12 may have any appropriate number of ground engaging devices 16.

Machine 12 also includes a mast 18 coupled to mobile platform 14. Mast 18 is a frame configured to hold a drill 20 and allow drill 20 to penetrate into the worksite surface. Mast 18 may be constructed of steel or any other appropriate material. Mast 18 may be directly pivotably connected to mobile platform 14 and may pivot by way of one or more hydraulic actuators 19. Alternatively, mast 18 may be pivotably connected to mobile platform 14 by way of a boom (not shown). It is contemplated that hydraulic actuators 19 may position mast 18 perpendicular to mobile platform 14 in an extended configuration and parallel to mobile platform 14 in a retracted configuration.

Drill 20 includes drill pipe 22, a drill bit 24, and a motor 26 configured to rotate or otherwise advance drill bit 24. It is contemplated that motor 26 may be, for example, a hydraulic or electric motor powered by the power source. It is further contemplated that motor 26 may be omitted, and drill 20 may be driven by the power source via one or more belts and/or gear trains.

Drill bit 24 may be a fixed cutter, roller-cone, hammer, auger, or any other appropriate type of drill bit known in the art. Drill bit 24 may be composed of steel, titanium, tungsten carbide, diamond, and/or other appropriate materials. Drill bit 24 may include one or more cutting surfaces 25 configured to cut through the worksite surface and underlying strata. Cutting surfaces 25 may comprise, for example, protrusions with a hardness greater than a hardness of the remaining bit. Cutting surfaces 25 may also comprise sharpened or tapered edges of drill bit 24. It is contemplated that cutting surfaces 25 may be composed of steel, tungsten carbide, and/or diamond (e.g., polycrystalline diamond).

Figure 2:
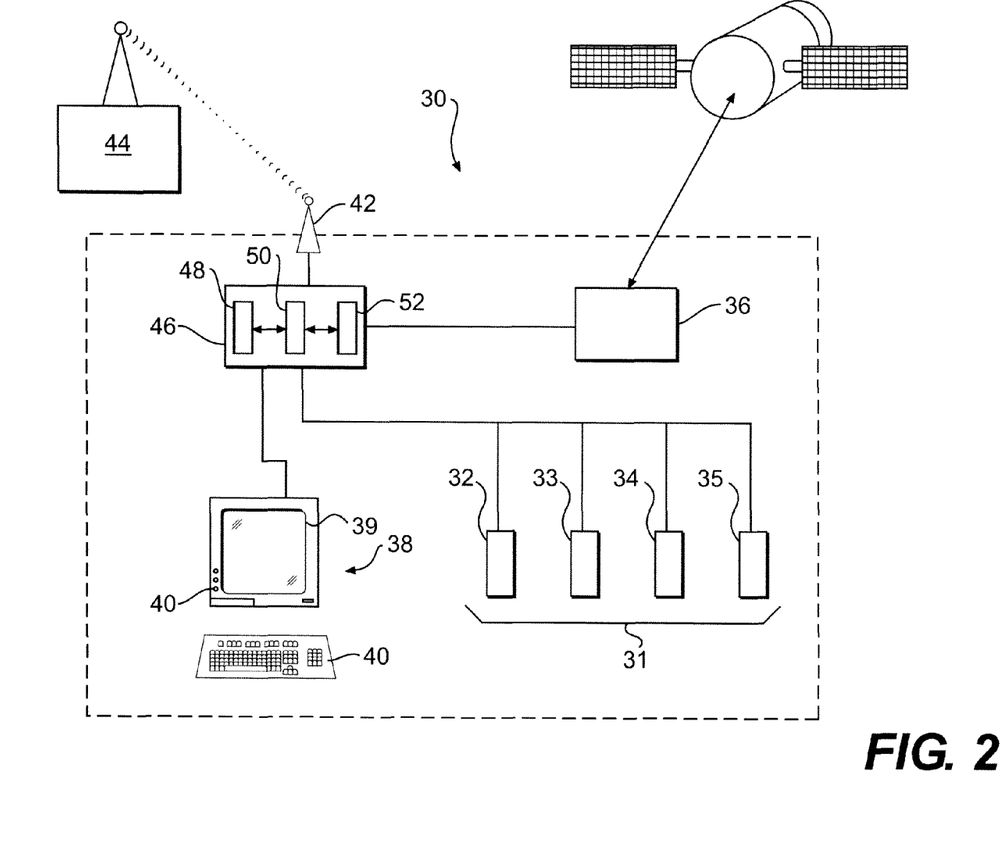
FIG. 2 is a diagrammatic illustration of an exemplary control system for use with the drill rig of FIG. 1.

FIG. 2 illustrates a control system 30 that may be integrated with machine 12 and configured to control one or more operations of machine 12. Control system 30 may be configured to monitor and/or control, for example, drilling into the surface of worksite 10 using drill 20. Control system 30 may include one or more sensors 31, a positioning system 36, an operator display 38, operator input devices 40, a communication device 42, and a controller 46.

Sensors 31 may be configured to sense or more parameters associated with operation of machine 12. Sensors 31 may include one or more rotational speed sensors 32 to determine a rotational speed of drill 20; torque sensors 33 configured to sense a torque experienced by drill 20; force sensors 34 to determine a weight applied to drill bit 24; and depth sensors 35 configured to track a depth of drill 20 or rate of progression (ROP) of drill 20. It is contemplated that depth sensors 35 may track a position of drill bit 24 or a length (e.g., number of sections) of drill pipe 22 inserted into the drill hole.

Positioning system 36 is configured to determine a position of machine 12. Positioning system 36 determines the position of machine 12, and particularly drill 20, within worksite 10. Positioning system 36 may communicate position information to controller 46 and may display the information to the operator. Positioning system 36 may embody, for example, a satellite based device (e.g., GPS, LEO, etc.), a radar based device, a radio frequency based device, or any other appropriate positioning device known in the art. In embodiments where positioning system 36 includes a satellite-based device, it is further contemplated that positioning system 36 may use dead reckoning, when, for example, a satellite signal is lost.

Operator display 38 may be configured to display information to the operator. Operator display 38 may embody an LCD, CRT, LED, or other type of display device. Operator display 38 may be associated with a user interface 39. User interface 39 may be a graphical user interface configured to create, view, store, and/or retrieve information related to one or more machine operations (e.g., drilling, traversing, etc.). User interface 39 may also display information about the worksite, such as topography, relief, contours, obstacles, worksite equipment, and other machines.

User interface 39 may receive input from operator input devices 40. Operator display 38 may be touch sensitive, and user interface 39 may receive input via operator interaction with operator display 38. User interface 39 may include menus, buttons, toolbars, and other means to facilitate the interaction between the operator and machine 12.

Operator input devices 40 may include knobs, buttons, and switches or other types of interfaces known in the art. In some embodiments, operator input devices 40 may include at least one of a keyboard, a mouse, or a trackpad.

Communication device 42 may be satellite-based, RF-based (e.g., cellular, radio, etc.), or other any other type of communication device known in the art. Controller 46 may use communication device 42 to communicate with other machines and/or an operation station 44. Operation station 44 may be, for example, a centralized planning location for the mining operation.

Controller 46 may embody a computer having a single microprocessor or multiple microprocessors. Numerous commercially available microprocessors may be configured to perform the functions of controller 46. Controller 46 may readily embody a general machine microprocessor capable of controlling numerous machine functions. Various circuits may be associated with controller 46, such as power supply circuitry, signal conditioning circuitry, data acquisition circuitry, signal output circuitry, signal amplification circuitry, and other types of circuitry known in the art.

Controller 46 may communicate with positioning system 36, operator display 38, operator input devices 40, and communication device 42. In some embodiments, controller 46 may be configured to communicate with other controllers associated with machine 12. Controller 46 may be connected with sensors 31 to receive feedback for control of machine 12.

Controller 46 may include one or more modules configured to control different aspects of machine 12. Controller 46 may include, for example, a drilling module 48, a strata module 50, and a wear module 52. Modules 48, 50, and 52 may be implemented solely by way of software, or may be implemented by way of hardware and software. In an alternative embodiment, each of modules 48, 50, and 52 may be located in a separate controller.

Drilling module 48 may be configured to control operation of drill 20. Specifically, drilling module 48 may receive a hole pattern, such as hole pattern 54 illustrated in FIG. 3. Hole pattern 54 has a plurality of planned holes 56 for drilling by machine 12. In one embodiment, hole pattern 54 may be generated at operation station 44 and transmitted to drilling module 48 via communication device 42. It is also contemplated that the hole pattern may be generated by a module of controller 46 or another computer associated with machine 12 and then transmitted to drilling module 48. It is further contemplated that the hole pattern may be transmitted to controller 46 via a physical storage device, such as a USB key, disk, or similar device.

Figure 3:
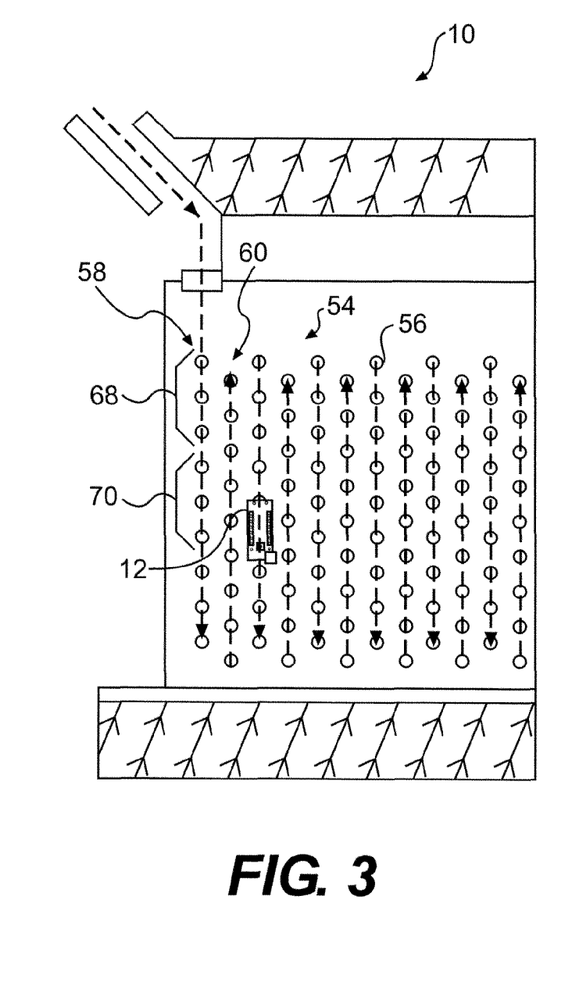
FIG. 3 is a diagrammatic illustration of a sequenced hole pattern used by the control system of FIG. 2.

After receipt of hole pattern 54, drilling module 48 may sequence the order in which the planned holes are drilled. Upon completion of the sequencing, drilling module 48 may control drill 20 in order to drill the planned holes per the sequenced hole pattern. Alternatively, the hole sequencing may take place at operation station 44, and the sequenced hole pattern may be transmitted to drilling module 48. Drilling module 48 may use input from positioning system 36 to position drill 20 at a planned hole.

A sequenced hole pattern may include one or more parallel rows of holes. Drilling module 48 may follow the sequenced instructions and cause machine 12 to drill, for example, a first row of holes 58. The first row of holes 58 may be drilled in sequence (e.g., a first hole followed by a second hole, followed by a third hole, etc.). It is contemplated that the holes in the first row of holes 58 may be arranged linearly, and the sequence may comprise drilling the holes from a first end of the row to a second end of the row in succession. After completing the first row of holes 58, drilling module 48 may instruct machine 12 to sequentially drill a second row of holes 60. The holes of the second row of holes 60 may also be arranged linearly. Each of first and second rows 58 and 60 may alternatively have a curved, zig-zag, or another arrangement. In some embodiments, the distance between each hole in the first row of holes 58 may be the same (i.e., the holes may be evenly spaced). The distance between each hole in the second row of holes 60 may also be the same. Alternatively, spacing of the holes in the first and second rows 58 and 60 may be varied to account for local conditions in worksite 10.

Hole pattern 54 may include additional rows of holes with features similar to those of first and second row 58 and 60.

Drilling module 48 be configured to control an orientation, speed, and length of drill 20 at a planned hole location such that desired hole characteristics are achieved. The desired hole characteristics may include, for example, hole depth and hole orientation (angle of hole, etc.). Drilling module 48 may communicate with sensors 31 in order to receive feedback regarding the drilling process.

Returning to FIG. 2, strata module 50 is configured to identify different strata that drill 20 has passed through. Specifically, strata module 50 may determine when drill 20 has passed from one layer of material to another layer of material, thus identifying each layer through which drill 20 passes. Strata module 50 may include one or more internal models, such as the following energy model:

$$\text{Energy} = f(T, \omega, WOB, \Phi, ROP), \quad (1)$$

where T is the torque on the drill, $\omega$ is the rotational speed of the drill, $\Phi$ is the diameter of the hole, WOB is the weight on the drill bit, and ROP is the rate of penetration of the drill. It is contemplated that strata module 50 may continuously calculate energy during operation of drill 20. Strata module 50 may determine that changes in the calculated energy while drilling a single hole are indicative of new layers of earth through which drill 20 is passing. It is also contemplated that strata module 50 may compare measured parameters to one or more look up tables for strata identification.

Strata module 50 may determine the parameters necessary for calculating energy by using data from sensors 31. For example, T may be determined using output from torque sensor 33; $\omega$ may be determined using output from rotational speed sensor 32; $\Phi$ may be entered by an operator or may be preset for a given drill bit 24; WOB may be determined using output from force sensor 34; and ROP may be determined using output from depth sensor 35.

Strata module 50 may associate the strata information with a particular hole location using the hole pattern and position information from positioning system 36. Strata module 50 may output the detected strata for visualization on operator display 38 for each hole in the hole pattern. It is contemplated that each strata layer may be represented as a different color or a different pattern on operator display 38. Specifically, strata information may be displayed as colored or textured layers horizontally layered across display 38. The layers may include vertical representations (e.g., dashed or solid lines) of drill hole locations within the strata.

Wear module 52 is configured to determine wear on drill bit 24. Wear module 52 may calculate wear using a model, such as the energy model described above. Wear module 52 may alternatively or additionally compare measured parameters to look-up tables or any other appropriate means of determining energy. It is contemplated that wear module 52 may determine the energy for each hole drilled by drill 20 and may store the energy information in a memory of controller 46. Wear module 52 may determine the energy as a function of a depth of drill 20, thus creating an energy profile for each hole in the hole pattern. It is contemplated that controller 46 may compute energy information and provide it to both wear module 52 and strata module 50. Alternatively, each of wear module 52 and strata module 50 may perform separate energy computations.

Wear module 52 may group or average energy profiles for one or more drilled holes. For example, referring again to FIG. 3, wear module 52 may average energy profiles for a first group of holes 68 of the first row 58. Wear module may also average energy profiles for a second group of holes 70.

Machine 12 may have drilled first group of holes 68 prior to second group of holes 70. It is contemplated that the holes in first group 68 may be located near one another (e.g., the first few holes in a row), and the holes from second group 70 may also be located near one another (e.g., the following few holes in a row). In one embodiment, the number of holes in first group 68 may be the same as the number of holes in second group 70. In another embodiment, the number of holes in first group 68 may be greater than the number of holes in second group 70 (e.g., 3:2 or 2:1).

Additionally or alternatively to grouping energy profiles and averaging them, wear module 52 may filter one or more of the energy profiles. Wear module 52 may use a low pass filter or any other appropriate filter known in the art. It is contemplated that filtering/averaging energy profiles may remove spikes or dips in the energy profiles due to localized irregularities, such as hard spots, voids, etc.

Figure 4:
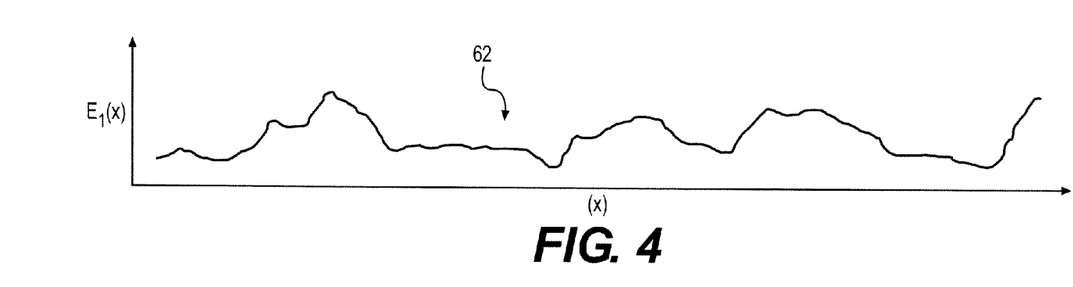
FIG. 4 is a diagrammatic illustration of an exemplary energy profile associated with a first hole or group of holes.
Figure 5:
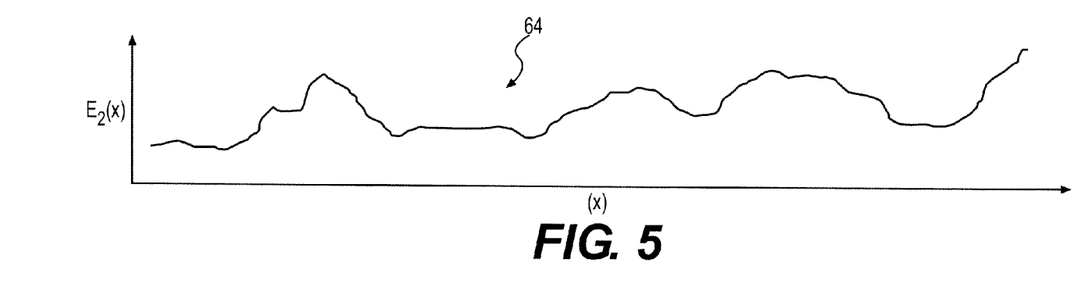
FIG. 5 is a diagrammatic illustration of an exemplary energy profile associated with a second hole or group of holes.
Figure 6:
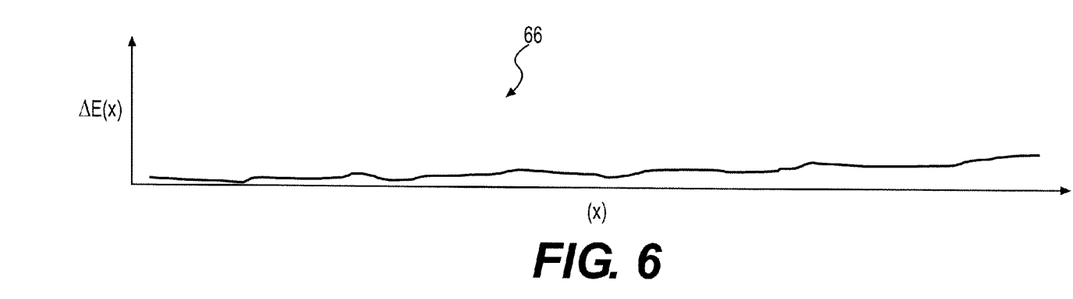
FIG. 6 is a diagrammatic illustration of an exemplary delta energy profile representing the difference between the profiles of FIGS. 4 and 5.

Referring to FIGS. 4-6, wear module 52 may generate a first and a second energy profile 62 and 64 during drilling. It is contemplated that second energy profile 64 may be associated with a later drilled hole or group of holes, while first energy profile 62 may be associated with an earlier drilled hole or group of holes. The later drilled hole or group of holes may be located near or adjacent to the earlier drilled hole or group of holes. Wear module 52 may subtract second energy profile 64 from first energy profile 62, resulting in a delta energy profile 66. It is contemplated that increases in the energy profile associated with the later drilled hole(s) as compared to the energy profile associated with the earlier drilled hole(s) may be caused by wearing down of drill bit 24.

In one embodiment, wear module 52 may sum up (e.g., integrate) the energy from delta energy profile 66 in order to calculate a total energy difference. Wear module 52 may compare the total energy difference to a wear threshold to determine if bit 24 has exceeded its useful life. Wear module 52 may compare the total energy difference to the wear threshold on a hole-by-hole or group by group basis. Alternatively or additionally, wear module 52 may keep a running total of all total energy differences computed for a given bit 24 to date, and wear module 52 may continuously compare the running total to the wear threshold to determine if bit 24 has exceeded its useful life.

Wear module 52 may also determine if bit 24 has exceeded its useful life by analyzing the energy profile in real time. Controller 46 may be configured to detect sudden increases in energy beyond a maximum threshold. Such sudden increases may be indicative of catastrophic failure of bit 24.

If the total energy difference is greater than the wear threshold or if the instant energy exceeds the maximum threshold, controller 46 may take action. For example, controller 46 may communicate an alert to an operator of machine 12. The alert may be audible or may be displayed on operator display 38. Controller 46 may additionally or alternatively transmit a message via communication system 42 to maintenance personnel indicating a need for changing of bit 24. Controller 46 may also automatically retract drill 20 and/or prevent further drilling until bit 24 is changed or repaired.

Controller 46 may also instruct operator display 38 to continuously display wear information in conjunction with the displayed strata information. Wear information may be displayed as a wear indicator bar with a percentage of useful life of bit 24 remaining, a life indicator with hours of drill time remaining, a counter with a number of remaining holes capable of being drilled with bit 24, or another similar indicator. It is also contemplated that an energy profile, similar to a profile illustrated in FIGS. 4 and 5, may be displayed adjacent to the display of strata information for a given drill hole represented on operator display 38. Alternatively, an operator may access a display (e.g., pop up or overlay) of an energy profile for a given hole by selecting a drill hole representation via touch screen or operator input device 40.

Controller 46 may cross-check output of wear module 52 against output of strata module 50 in order to confirm that calculated wear and/or detected failure of bit 24 is not a false positive due to drill 20 passing through different strata.

Figure 7:
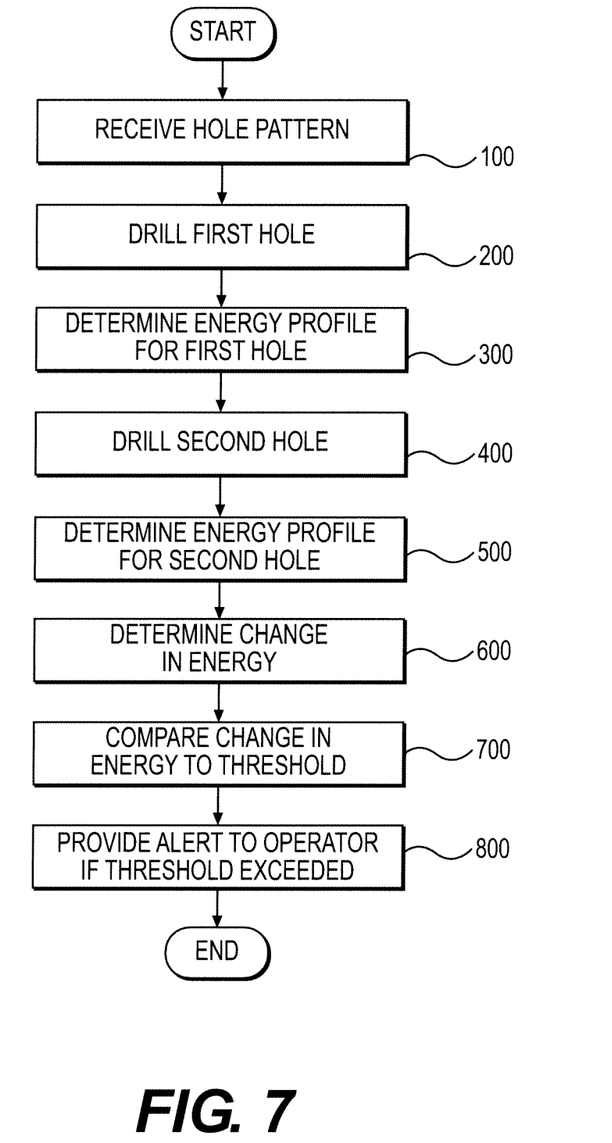
FIG. 7 is flowchart illustrating an exemplary method for detecting bit wear.

FIG. 7 illustrates an exemplary operation of controller 46 and wear module 52. Controller 46 may first receive a hole pattern having a plurality of substantially linear and parallel rows (step 100). After receipt of the hole pattern, controller 46 may sequence the order in which the planned holes are drilled. The sequence may comprise machine 12 drilling each row from a first end to a second end and then commencing drilling of an adjacent row. Controller 46 may utilize drilling module 48 to drill a first hole in a first row (step 200).

During drilling of the first hole, wear module 52 may calculate energy using Equation 1 as a function of a depth of drill 20, thus creating an energy profile for the first hole (step 300). Upon completion of drilling the first hole, controller 46 may utilize drilling module 48 to drill a second hole in the first row (step 400). The second hole may be adjacent to the first hole. During drilling of the second hole, wear module 52 may calculate energy using Equation 1, thus creating an energy profile for the second hole (step 500). It is contemplated that wear module 52 may also wait to perform calculations until after both holes are drilled.

Wear module 52 may then subtract the second energy profile from the first energy profile in order to create a delta energy profile (step 600). Wear module 52 may sum up the energy from delta energy profile 66 in order to calculate a total energy difference. Wear module 52 may compare the total energy difference to a wear threshold to determine if bit 24 has exceeded its useful life (step 700). If the total energy difference is greater than the wear threshold, controller 46 may provide an alert on operator display 38 (step 800). This process may be repeated during drilling of a third hole (e.g. determining an energy profile for the third hole, comparing the energy profile from the third hole to the energy profile from the second hole, determining if the wear threshold is exceeded, etc.). The process may be continued during the drilling of all holes in the hole pattern.

INDUSTRIAL APPLICABILITY

The disclosed method and apparatus for detection of drill bit wear may be applicable to any drilling device. The disclosed wear detection method and apparatus may improve efficiency of a drilling operation by quickly detecting a bit that has exceeded or is about to exceed its useful life and taking action so that the bit is changed. The disclosed use of energy calculations to determine wear may also be an accurate and effective means of quantifying wear. The disclosed method and apparatus may also combine wear information with strata information to simultaneously account for changes in both, thus avoiding errors that may occur due to failure to account for one or the other.

It will be apparent to those skilled in the art that various modifications and variations can be made to the disclosed method and apparatus. Other embodiments will be apparent to those skilled in the art from consideration of the specification and practice of the disclosed method and apparatus. For example, the disclosed system may include a vibration or other secondary sensor to verify the wear and/or strata calculations. It is intended that the specification and examples be considered as exemplary only, with a true scope being indicated by the following claims.

What is claimed is:

1. A method for determining wear of a drill bit, comprising:
   drilling a first hole in a worksite based on a hole pattern having a plurality of planned holes;
   determining an energy required to drill the first hole;
   drilling a second hole in the worksite;
   determining an energy required to drill the second hole;
   determining a wear of the drill bit using the determined energy required to drill the first hole and the determined energy required to drill the second hole; and
   determining strata through which the drill bit is passing during drilling the first hole and drilling the second hole.

2. The method of claim 1, wherein determining the wear further comprises determining a delta between the determined energy required to drill the first hole and the determined energy required to drill the second hole.

3. The method of claim 2, further comprising determining if the delta exceeds a threshold delta.

4. The method of claim 3, further comprising discontinuing further drilling when the delta exceeds the threshold delta.

5. The method of claim 3, further comprising providing an alert when the delta exceeds the threshold delta.

6. The method of claim 5, wherein the drilling is performed by a drill rig having a drill and the alert is provided to at least one of maintenance personnel or an operator of the drill rig.

7. The method of claim 6, wherein the energy required to drill the first hole is determined as a function of a torque on the drill, a rotational speed of the drill, a diameter of the first hole, a weight on the drill bit, and a rate of penetration of the drill.

8. The method of claim 1, wherein the strata are displayed to an operator via an operator display.

9. A control system for a mobile drill rig, comprising:
   a drill; and
   a controller configured to:
      drill a first hole in the worksite with the drill based on a hole pattern having a plurality of planned holes;
      determine an energy required to drill the first hole, wherein the determined energy required to drill the first hole is used to identify strata through which the first hole passes;
      drill a second hole in the worksite with the drill adjacent the first hole;
      determine an energy required to drill the second hole, wherein the determined energy required to drill the second hole is used to identify strata through which the second hole passes;
      determine a wear of the drill bit using the determined energy required to drill the first hole and the determined energy required to drill the second hole; and
      communicate the strata information and wear information to an operator of the drill rig.

10. The system of claim 9, wherein determining the wear further comprises determining a delta between the determined energy required to drill the first hole and the determined energy required to drill the second hole.

11. The system of claim 10, wherein the controller is configured to determine if the delta exceeds a threshold delta.

12. The system of claim 11, wherein the controller is configured to discontinue further drilling when the delta exceeds the threshold delta.

13. The system of claim 11, wherein the controller is configured to provide an alert when the delta exceeds the threshold delta.

14. The system of claim 13, wherein the alert is provided to at least one of maintenance personnel or an operator of the drill rig.

15. The system of claim 14, wherein the energy required to drill the first hole is determined as a function of a torque on the drill, a rotational speed of the drill, a diameter of the first hole, a weight on the drill bit, and a rate of penetration of the drill.

16. A method for determining wear of a drill bit, comprising:
drilling a first hole in a worksite based on a hole pattern having a plurality of planned holes;
determining an energy required to drill the first hole, wherein the determined energy required to drill the first hole is used to identify strata through which the first hole passes;
drilling a second hole in the worksite adjacent the first hole;
determining an energy required to drill the second hole, wherein the determined energy required to drill the second hole is used to identify strata through which the second hole passes;
determining a wear of the drill bit using the determined energy required to drill the first hole and the determined energy required to drill the second hole; and
displaying strata and wear information to an operator of the drill rig.

17. The method of claim 16, wherein determining the wear further comprises determining a delta between the determined energy required to drill the first hole and the determined energy required to drill the second hole.

18. The method of claim 17, further comprising determining if the delta exceeds a threshold delta.

19. The method of claim 18, further comprising providing an alert when the delta exceeds the threshold delta.

20. The method of claim 18, further comprising discontinuing further drilling when the delta exceeds the threshold delta.

* * * * *